US012645400B2

(12) United States Patent
Sano et al.

(10) Patent No.: US 12,645,400 B2
(45) Date of Patent: Jun. 2, 2026

(54) INFORMATION PROCESSING SYSTEM CONTROLLING FIRST AND SECOND MEMORY DEVICES

(71) Applicant: Kioxia Corporation, Tokyo (JP)

(72) Inventors: Shintaro Sano, Kawasaki (JP); Tomoya Suzuki, Tokyo (JP); Hirotsugu Kajihara, Yokohama (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/630,146

(22) Filed: Apr. 9, 2024

(65) Prior Publication Data

US 2024/0345774 A1     Oct. 17, 2024

(30) Foreign Application Priority Data

Apr. 11, 2023     (JP) ................................. 2023-064266

(51) Int. Cl.
*G06F 3/06* (2006.01)
*G06F 12/0862* (2016.01)

(52) U.S. Cl.
CPC .......... *G06F 3/0659* (2013.01); *G06F 3/0604* (2013.01); *G06F 3/0679* (2013.01); *G06F 12/0862* (2013.01)

(58) Field of Classification Search
CPC .... G06F 3/0604; G06F 3/0659; G06F 3/0679; G06F 12/0862; G06F 2212/1024; G06F 2212/6028
See application file for complete search history.

(56) References Cited

U.S. PATENT DOCUMENTS

| | | | |
|---|---|---|---|
| 9,996,350 B2 | 6/2018 | Lee et al. | |
| 2016/0188337 A1 | 6/2016 | Lee et al. | |
| 2017/0286305 A1* | 10/2017 | Kalwitz | .............. G06F 12/0862 |
| 2018/0260145 A1* | 9/2018 | Margetts | ................. G06F 13/16 |
| 2020/0004685 A1 | 1/2020 | Guim Bernat et al. | |
| 2020/0319882 A1* | 10/2020 | Liang | ...................... G06F 3/061 |
| 2021/0149599 A1 | 5/2021 | Kajihara et al. | |
| 2021/0173779 A1 | 6/2021 | Sutardja | |
| 2021/0286752 A1 | 9/2021 | Modukuri et al. | |
| 2021/0405913 A1* | 12/2021 | Stonelake | ........... G06F 11/3037 |
| 2022/0057954 A1 | 2/2022 | Cui et al. | |
| 2022/0066636 A1 | 3/2022 | Taki | |
| 2022/0083269 A1 | 3/2022 | Sano et al. | |

(Continued)

FOREIGN PATENT DOCUMENTS

| | | |
|---|---|---|
| JP | 202181858 A | 5/2021 |
| JP | 202238688 A | 3/2022 |

(Continued)

*Primary Examiner* — Larry T Mackall

(74) *Attorney, Agent, or Firm* — Maier & Maier, PLLC

(57)     ABSTRACT

According to one embodiment, an information processing system includes a processor, a first memory device, and a second memory device including a nonvolatile memory. The nonvolatile memory is accessed by a load/store command. Before issuing a load command to load data stored in the nonvolatile memory, the processor is configured to write a request to instruct prefetching the data to the first memory device. The second memory device includes a controller configured to prefetch the data stored in the nonvolatile memory, based on the request written to the first memory device.

5 Claims, 13 Drawing Sheets

(56) References Cited

U.S. PATENT DOCUMENTS

| 2022/0083271 | A1* | 3/2022 | Cho | ...................... | G06F 3/0604 |
| 2022/0113915 | A1 | 4/2022 | Ki et al. | | |
| 2023/0004306 | A1 | 1/2023 | Onishi | | |

FOREIGN PATENT DOCUMENTS

| JP | 202248716 | A | 3/2022 |
| JP | 20237761 | A | 1/2023 |

* cited by examiner

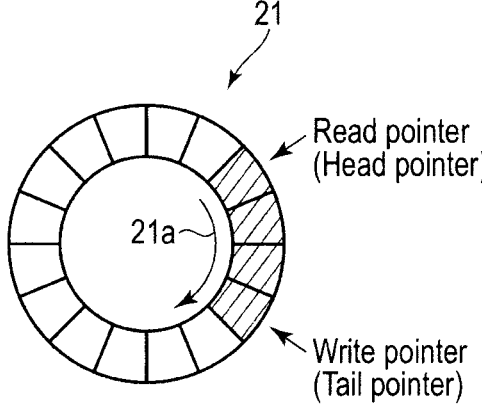
F I G. 3
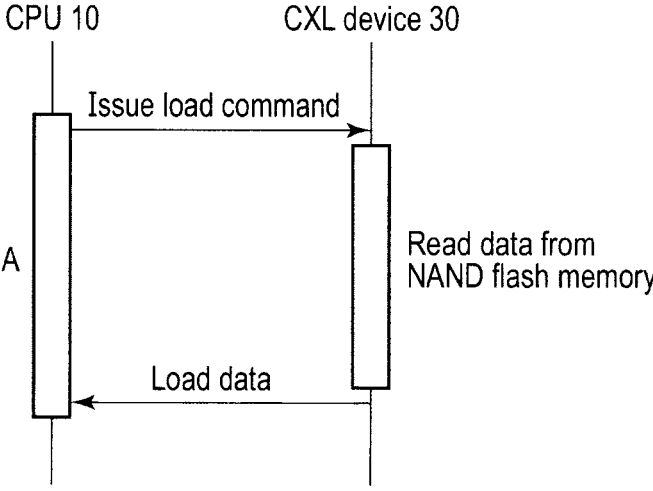
F I G. 4

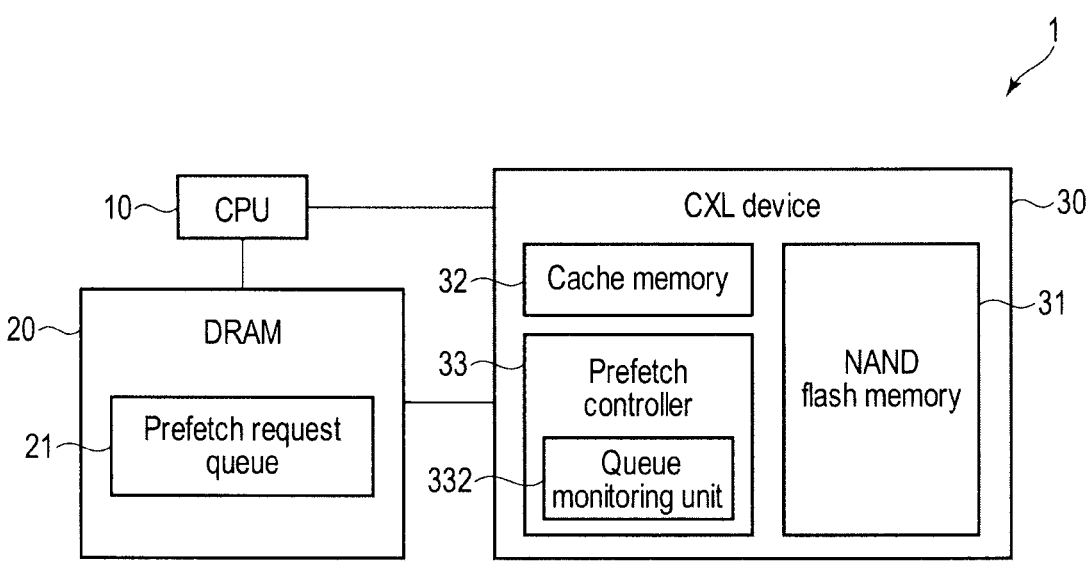
F I G. 5
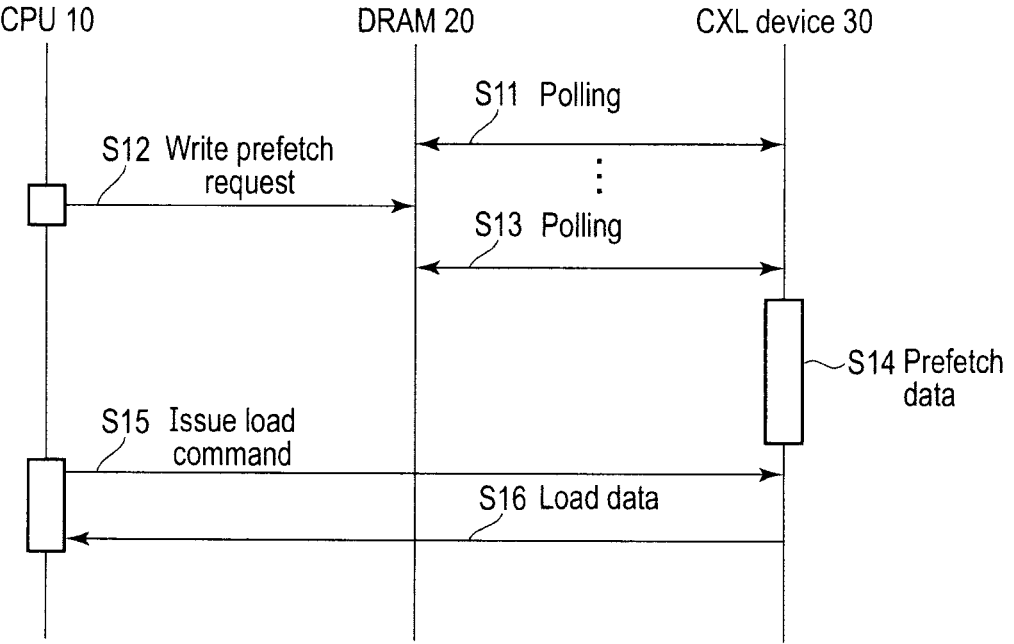
F I G. 6

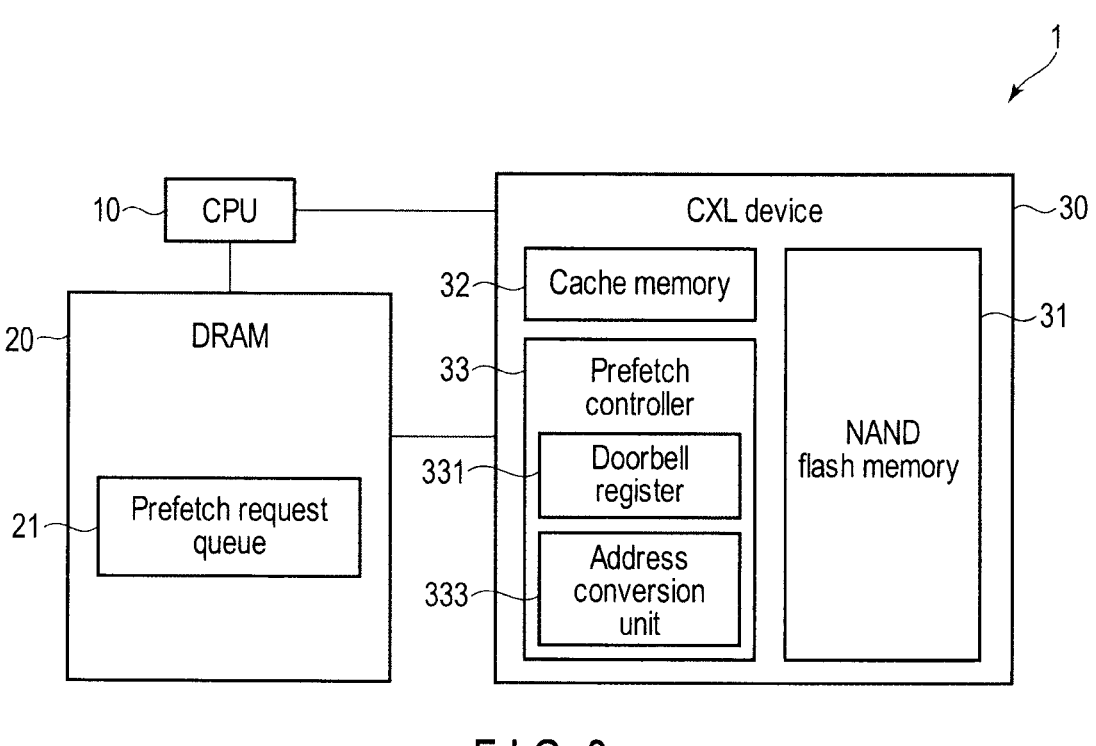
F I G. 8
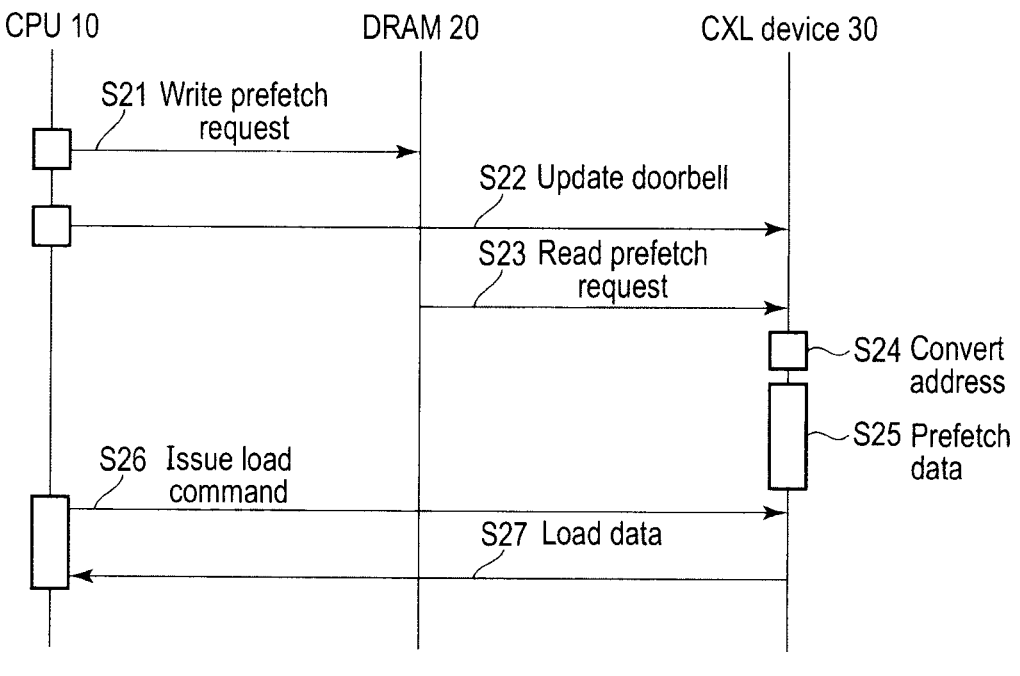
F I G. 9

| Virtual address 0 | Physical address 0 |
|---|---|
| Virtual address 1 | Physical address 1 |
| Virtual address 2 | Physical address 2 |
| . . . | . . . |

F I G. 10

| Virtual address range 0 | Physical address range 0 |
|---|---|
| Virtual address range 1 | Physical address range 1 |
| Virtual address range 2 | Physical address range 2 |
| . . . | . . . |

F I G. 11

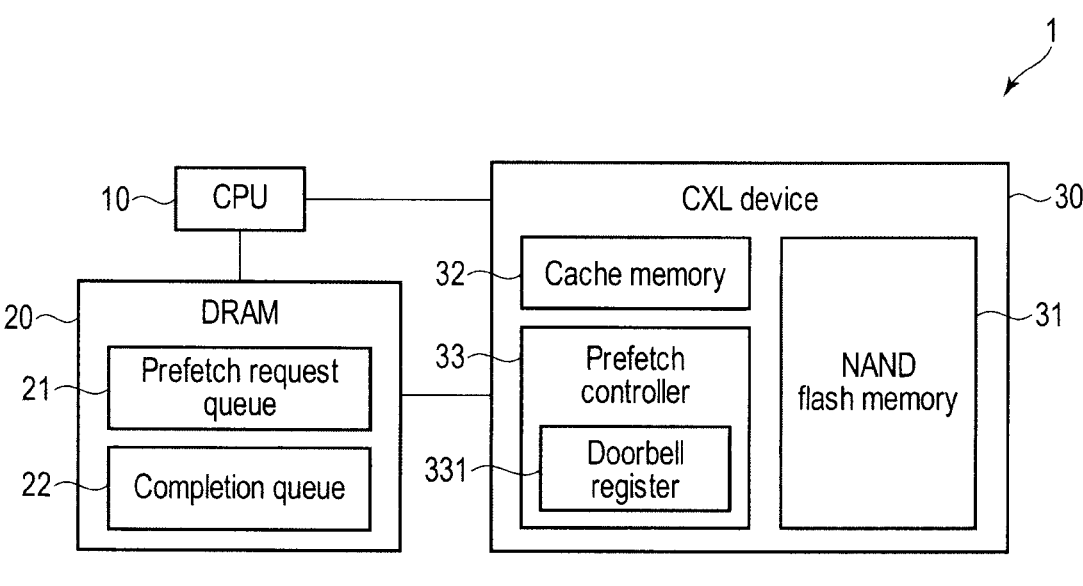
F I G. 12
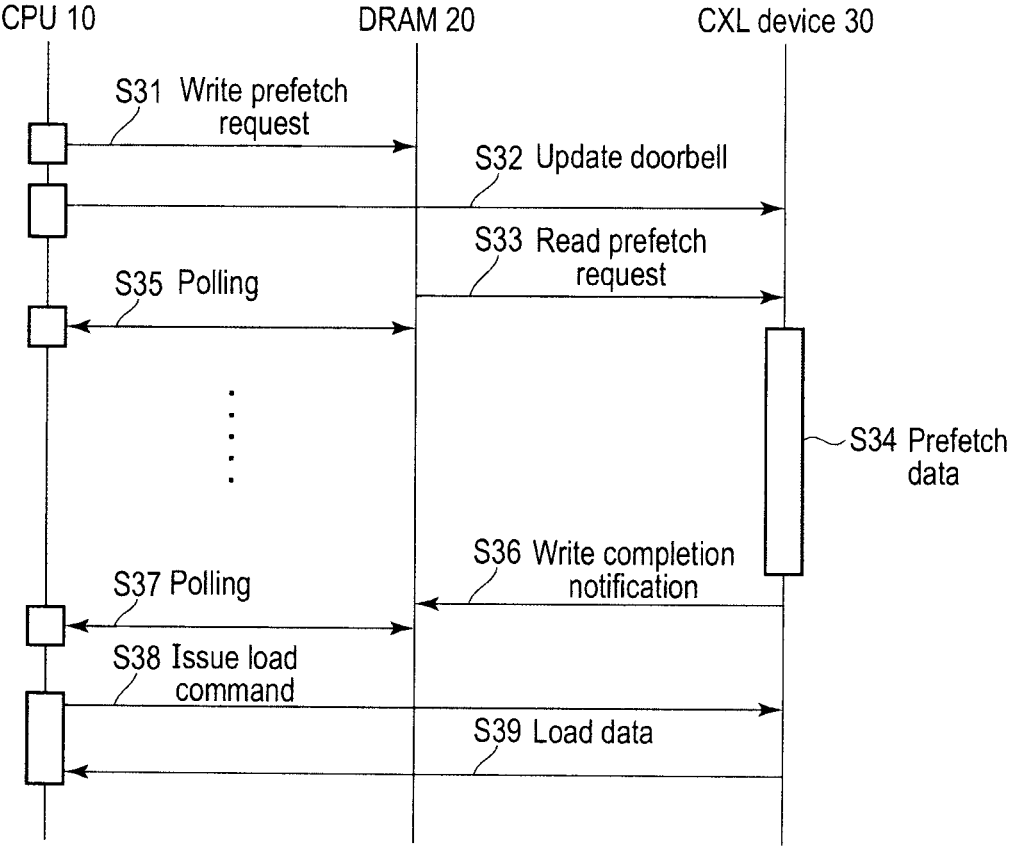
F I G. 13

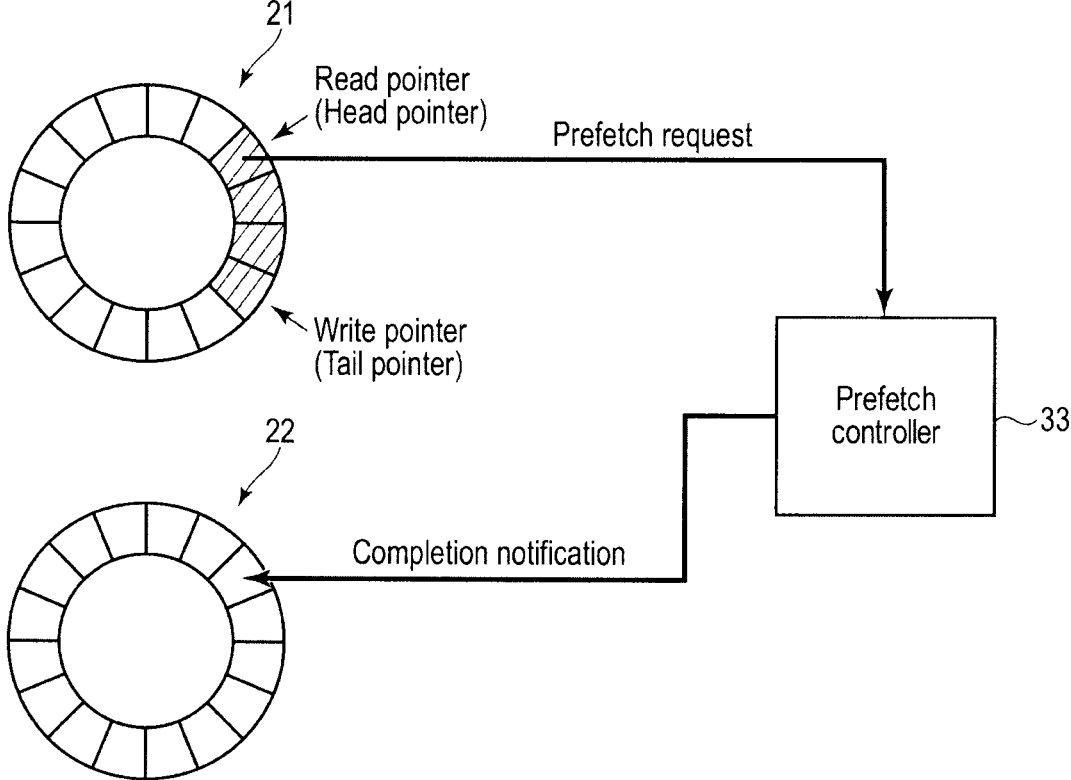
F I G. 14

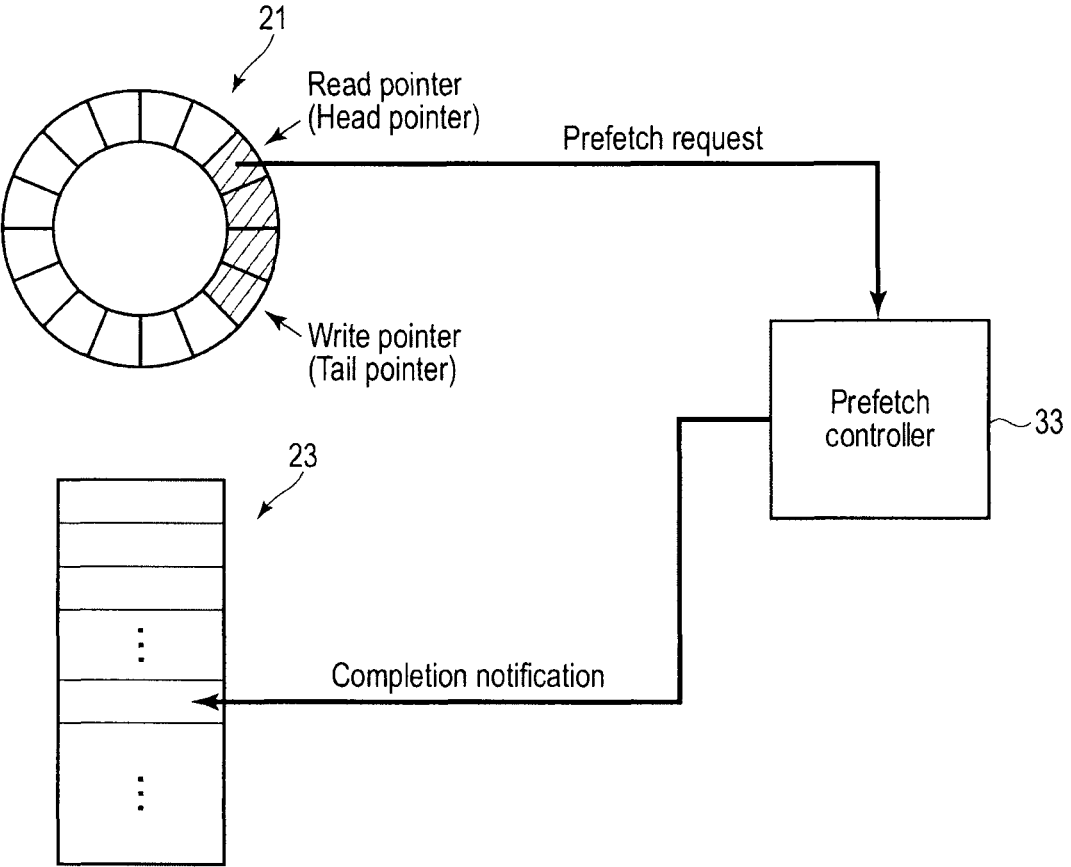
F I G. 15

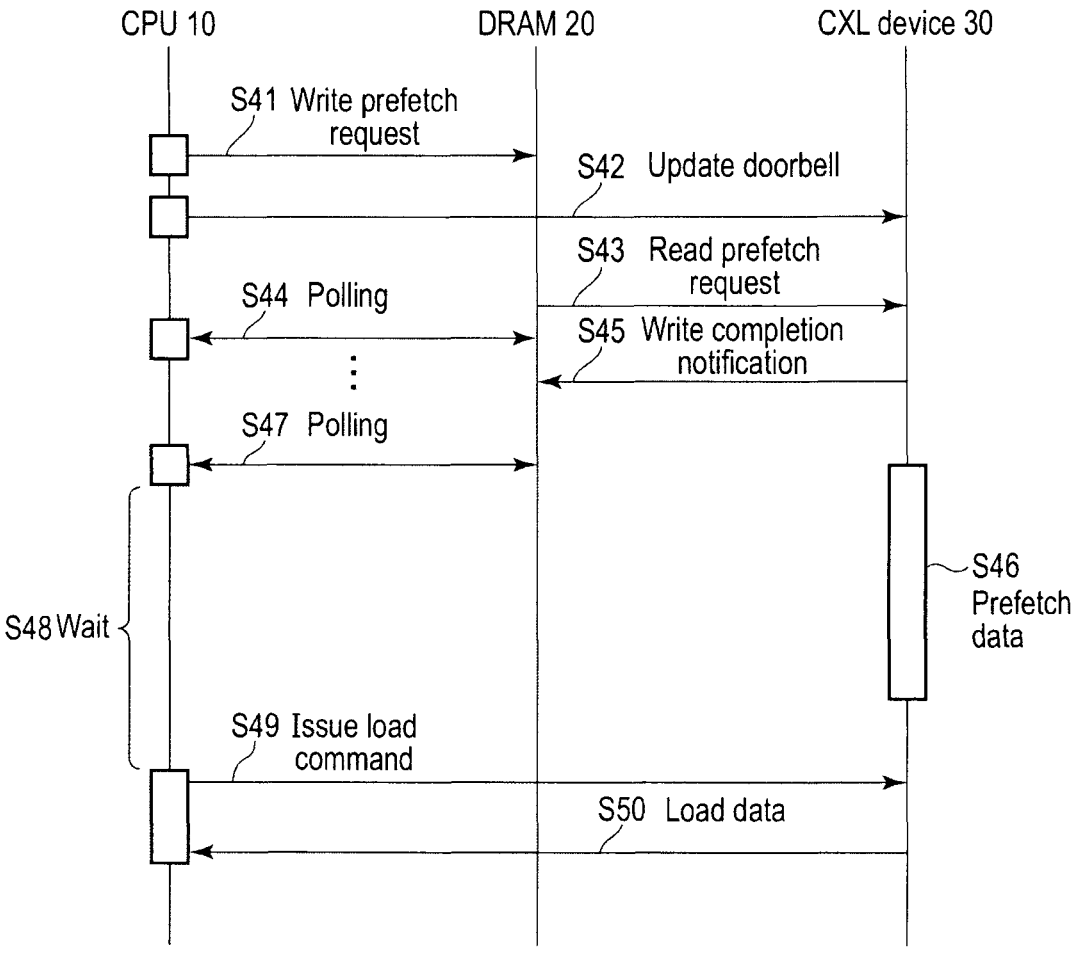
F I G. 16

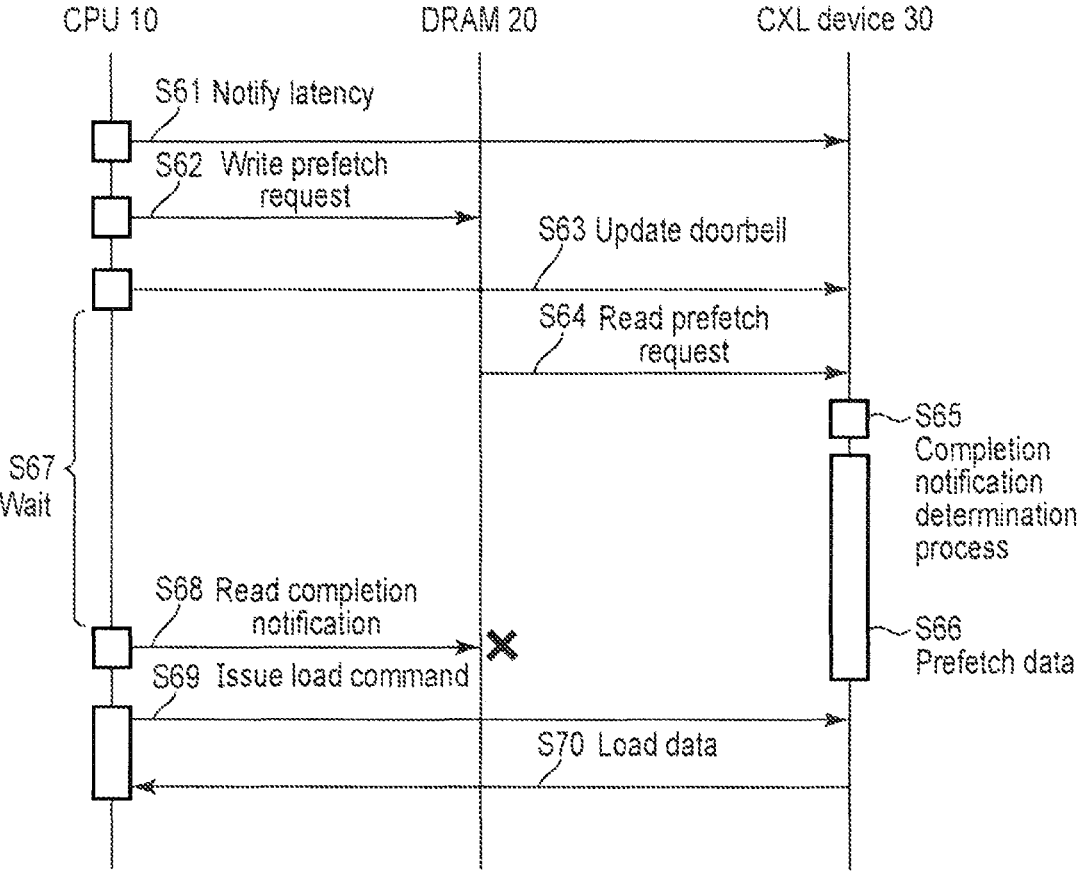
F I G. 19

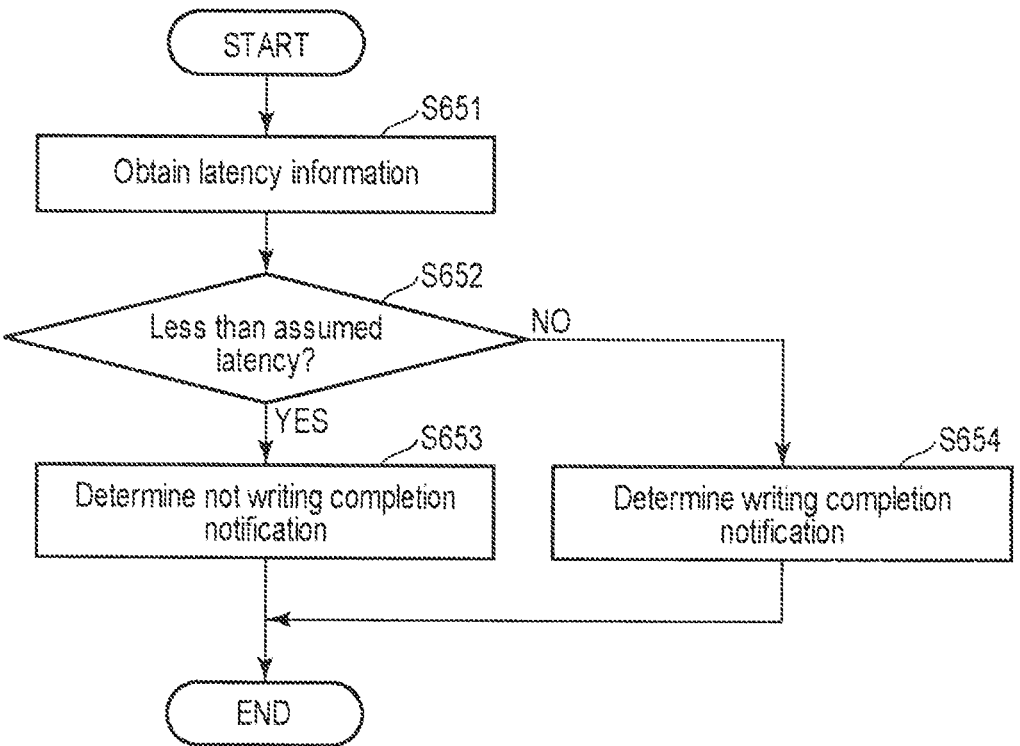
F I G. 20

INFORMATION PROCESSING SYSTEM CONTROLLING FIRST AND SECOND MEMORY DEVICES

CROSS-REFERENCE TO RELATED APPLICATIONS

This application is based upon and claims the benefit of priority from Japanese Patent Application No. 2023-064266, filed Apr. 11, 2023, the entire contents of which are incorporated herein by reference.

FIELD

Embodiments described herein relate generally to an information processing system.

BACKGROUND

In recent years, memory devices with nonvolatile memory (e.g., NAND flash memory) are known, and the use of such memory devices as part of main memory (main storage device) configured with a dynamic random access memory (DRAM), and the like, is considered.

However, the above-mentioned memory devices have an advantage of lower costs than DRAM while the memory devices have longer data read latency than DRAM. Improvement of read performance of the memory devices is therefore required.

BRIEF DESCRIPTION OF THE DRAWINGS

FIG. 3 is a view illustrating a prefetch request queue in the first embodiment.

FIG. 4 is a view illustrating a read performance of a CXL device in the first embodiment.

FIG. 5 is a block diagram showing a configuration example of an information processing system according to a second embodiment.

FIG. 6 is a sequence chart showing a configuration example of the information processing system according to the second embodiment.

FIG. 8 is a block diagram showing a configuration example of an information processing system according to a third embodiment.

FIG. 9 is a sequence chart showing a configuration example of the information processing system according to the third embodiment.

FIG. 10 is a table showing an example of a data structure of an address conversion table in the third embodiment.

FIG. 11 is a table showing another example of the data structure of the address conversion table in the third embodiment.

FIG. 12 is a block diagram showing a configuration example of an information processing system according to a fourth embodiment.

FIG. 13 is a sequence chart showing an example of a procedure of the information processing system according to the fourth embodiment.

FIG. 14 is a view illustrating an overview of operations of the information processing system according to the fourth embodiment.

FIG. 15 is a view illustrating an overview of the operations of the information processing system when a completion map is used instead of a completion queue in the fourth embodiment.

FIG. 16 is a sequence chart showing an example of a procedure of the information processing system according to a first modified example of the fourth embodiment.

FIG. 19 is a sequence chart showing an example of a procedure of the information processing system according to a second modified example of the fourth embodiment.

FIG. 20 is a flowchart showing an example of a procedure of a completion notification determination process in the second modified example of the fourth embodiment.

DETAILED DESCRIPTION

In general, according to one embodiment, an information processing system includes a processor, a first memory device, and a second memory device including a nonvolatile memory. The nonvolatile memory is accessed by a load/store command. Before issuing a load command to load data stored in the nonvolatile memory, the processor is configured to write a request to instruct prefetching the data to the first memory device. The second memory device includes a controller configured to prefetch the data stored in the nonvolatile memory, based on the request written to the first memory device.

Embodiments will be described hereinafter with reference to the accompanying drawings.

First Embodiment

Figure 1:
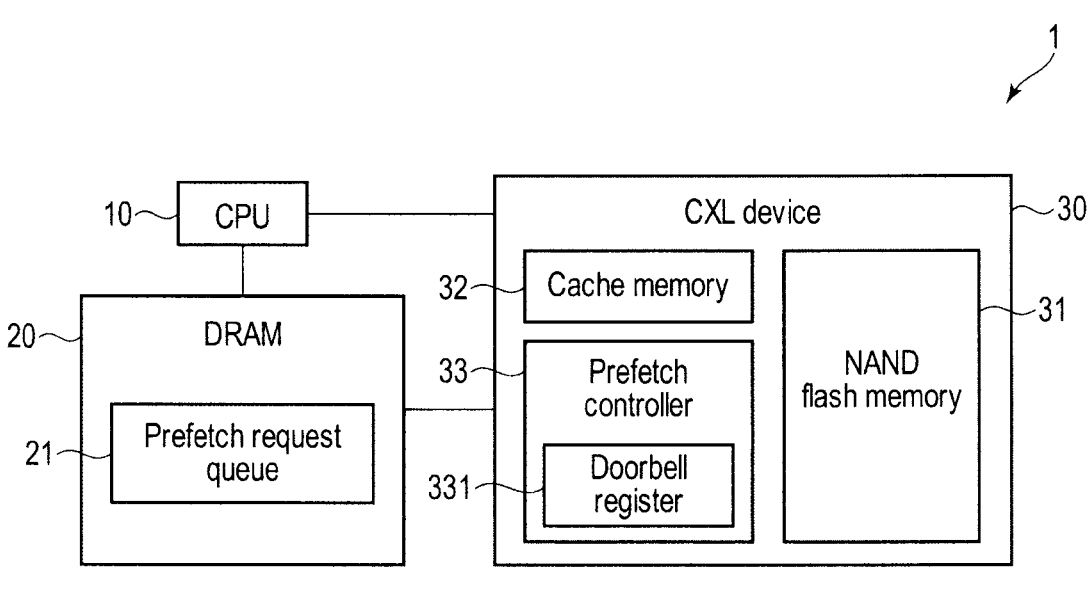
FIG. 1 is a block diagram showing a configuration example of an information processing system according to a first embodiment.

First, a first embodiment will be described. FIG. 1 is a block diagram showing a configuration example of an information processing system according to the present embodiment. As shown in FIG. 1, the information processing system 1 includes a CPU 10, a dynamic random access memory (DRAM) 20, and a CXL device 30. In the information processing system 1, the CPU 10, the DRAM 20, and the CXL device 30 are connected to each other via a bus.

The CPU 10 is a processor provided in an information processing device which operates as a host, and is configured to access the DRAM 20 and the CXL device 30. The CPU 10 is, for example, a multi-core processor, and is configured to execute a plurality of programs (application programs) in parallel.

The DRAM 20 is a memory device which is a main memory in the information processing system 1.

It is assumed in the present embodiment that the CXL device 30 further operates as (part of) the main memory in order to increase the capacity of the main memory.

The CXL device 30 is, for example, a memory device which stores various data accessed (loaded/stored) by the CPU 10 executing application programs. Incidentally, the bus (memory bus) connecting the CPU 10 and the CXL device 30 is, for example, a CXL bus compliant with Compute Express Link™ (CXL) standard. CXL is the standard which defines three independent protocols, i.e., CXL.io, CXL.cache, and CXL.mem, based on PCI Express (PCIe). The CXL device 30 includes an interface using CXL.mem protocol which enables access to media (nonvolatile memory) by load/store commands from the CPU 10. Alternatively, the CXL device 30 may include an interface using CXL.io protocol. CXL.io is mainly used for register access within the CXL device. Similarly, the CXL device 30 may include an interface using CXL.cache protocol. CXL.cache includes access to media (nonvolatile memory) and is used as a coherent controllable protocol for the host memory and the cache. CXL.mem is assumed to be used for access to CXL device 30 in the following descriptions unless otherwise specified in the present embodiment. Incidentally, the CXL device 30 may also be referred to as a memory system.

The CXL device 30 connected to the CPU 10 via the CXL bus will be mainly described in the present embodiment, but the CXL device 30 may be any other memory device connected to the CPU 10 via a bus compliant with other standards.

By the way, the CXL device 30 includes a nonvolatile memory to be described below, and has performance intermediate between the DRAM 20 and a storage device (e.g., SSD or the like). More specifically, the storage capacity of the CXL device 30 is larger than that of the DRAM 20, and the access speed to the CXL device 30 is faster than that of the storage device. In the present embodiment, increase in main memory capacity can be substantially implemented by using the CXL device 30.

However, since the CXL device 30 has a longer latency (delay time) in reading data from the nonvolatile memory as compared to the DRAM 20, a mechanism to improve the read performance of the CXL device 30 is necessary.

As shown in FIG. 1, the CXL device 30 includes a NAND flash memory (memory unit) 31 and a cache memory (cache unit) 32.

The NAND flash memory 31 corresponds to the above-mentioned nonvolatile memory. The NAND flash memory 31 is, for example, a flash memory with a three-dimensional structure. The NAND flash memory 31 includes a plurality of blocks. Each of the plurality of blocks is a unit of data erase operation. In addition, each of the plurality of blocks includes a plurality of physical pages. Each of the plurality of physical pages includes a plurality of memory cells connected to the same word line. Each of the plurality of physical pages is a unit of a data write operation and a data read operation.

The cache memory 32 is a volatile memory operating as a cache memory for the NAND flash memory 31, and operates to cache store data from the CPU 10 and data read from the NAND flash memory 31. The cache memory 32 is controlled by, for example, a direct map method or a multi-way set-associative method. It is assumed in the present embodiment that the cache memory 32 is configured with, for example a static random access memory (SRAM) provided in the CXL device 30, but the cache memory 32 may be configured with DRAM provided in the CXL device 30.

The operations of the NAND flash memory 31 and the cache memory 32 described above will be briefly explained below.

For example, when the CPU 10 loads (reads) data from the CXL device 30, the CPU 10 issues a load command (MemRd Request) to request the data. When the data requested in the load command issued by the CPU 10 is stored in the cache memory 32, the CXL device 30 reads the data from the cache memory 32 and returns the data to the CPU 10.

In contrast, when the data requested in the load command is not stored in the cache memory 32, the CXL device 30 reads the data from the NAND flash memory 31 and returns the data to the CPU 10. Incidentally, by storing the data read from the NAND flash memory 31 in the cache memory 32 at this timing, the data can be read from the cache memory 32 and returned to the CPU 10 for subsequent load commands to the data.

Since the cache memory 32 (e.g., SRAM) can read data faster than the NAND flash memory 31, the read performance of the CXL device 30 can be improved when the data requested in the load command is stored in the cache memory 32. In contrast, when the data requested in the load command is not stored in the cache memory 32, the read performance of the CXL device 30 cannot be improved.

For this reason, in the information processing system 1 according to the present embodiment, the latency in reading the data from the CXL device 30 (NAND flash memory 31) is assumed to be concealed by prefetching the data scheduled to be loaded based on the load command (hereinafter referred to as the target data) stored in the NAND flash memory 31 before the CPU 10 issues the load command.

In this case, the DRAM 20 in the present embodiment includes a prefetch request queue 21. A request instructing prefetching of target data stored in the CXL device 30 (NAND flash memory 31) (hereinafter referred to as a prefetch request) is written to the prefetch request queue 21.

Furthermore, the CXL device 30 in the present embodiment includes a prefetch controller 33 in addition to the NAND flash memory 31 and the cache memory 32 described above. In addition, the prefetch controller 33 also includes a doorbell register 331.

In the present embodiment, the prefetch controller 33 can be realized in either hardware or software, or can be realized by a combination of both hardware and software. Alternatively, the CXL device 30 may include a controller controlling data write to and data read from the NAND flash memory 31, and the controller may be configured to include the prefetch controller 33. In this case, the controller is a control circuit such as System-on-a-Chip (SoC) and is also configured to control data write to and data read from the cache memory 32.

The doorbell register 331 is notified that a prefetch request has been written to the prefetch request queue 21 (i.e., a current write pointer position in the prefetch request queue 21). When detecting that the write pointer position of the prefetch request queue 21 in the doorbell register 331 has been updated, the prefetch controller 33 reads the prefetch request written to the prefetch request queue 21 from the prefetch request queue 21 and performs prefetching the target data, based on the read prefetch request.

In the present embodiment, prefetching means, for example, reading the target data from the NAND flash memory 31 and writing (storing) the target data to the cache memory 32. In other words, the above-described prefetch request can be an instruction to transfer the target data from the NAND flash memory 31 to the cache memory 32.

An example of a procedure of the information processing system 1 according to the present embodiment will be described below with reference to a sequence chart in FIG. 2.

When a predetermined application program is executed in an information processing device (host) including the CPU 10 as described above and the CPU 10 thereby loads data stored in the CXL Device 30, the CPU 10 needs to issue a load command requesting the data and access the CXL device 30.

In the present embodiment, however, the CPU 10 issues the prefetch request before issuing the load command, and writes the prefetch request to prefetch request queue 21 included in the DRAM 20 (step S1). In the sequence chart in FIG. 2, rectangular blocks corresponding to the processing of the CPU 10, such as step S1, represent the processing time of the CPU 10. The rectangular blocks also represent the processing time in sequence charts to be described below.

In the present embodiment, the address assigned to the above-described target data (i.e., data to be loaded based on the load command) is included in the prefetch request written to the prefetch request queue 21. The address included in the prefetch request includes, for example, the memory address (physical address) assigned to the CXL device 30 by the system.

The prefetch request queue 21 will be described with reference to FIG. 3. As shown in FIG. 3, the prefetch request queue 21 is realized as a ring queue (ring buffer) and can be loaded with a plurality of prefetch requests.

In the prefetch request queue 21, the prefetch requests are stored in order along a direction of arrow 21$a$ shown in FIG. 3. In addition, the prefetch requests stored in the prefetch request queue 21 are managed using a read pointer (Head pointer) and a write pointer (Tail pointer). The read pointer is a pointer indicating a position where a prefetch request to be next read is stored, and is managed in the prefetch controller 33. The write pointer is a pointer indicating a position where a last written prefetch request is stored, and is managed on the host (CPU 10) side.

The descriptions return to FIG. 2. The CPU 10 updates the doorbell register of the prefetch request queue 21 to notify that the prefetch request has been written to the prefetch request queue 21 in step S1 (step S2). More specifically, the CPU 10 writes the write pointer position to the doorbell register 331 of the prefetch controller 33 included in the CXL device 30. In addition, the CXL device 30 is connected to the CPU 10 via the CXL bus as described above, and it is assumed that the process of step S2 is performed in accordance with, for example, CXL.io.

When detecting that the write pointer position written to the doorbell register 331 has been updated (i.e., notified from the CPU 10) by the execution of the process of step S2, the prefetch controller 33 accesses the DRAM 20 and reads the prefetch request from the prefetch request queue 21 in accordance with the write pointer position (step S3).

After the process of step S3 is executed, the prefetch controller 33 prefetches the target data based on the prefetch request read in step S3 (step S4). In this case, the prefetch controller 33 performs a process of reading the target data from the NAND flash memory 31, based on the address included in the prefetch request, and writing the read target data to the cache memory 32.

It is assumed that a load command (MemRd Request) to load the target data is issued by the CPU 10 after the above-described processes of steps S1 to S5 are executed (step S5). In this case, since the target data is stored in the cache memory 32 by performing the above-described process of step S4, the CPU 10 can load (read) the target data from the cache memory 32 (step S6).

As described above, in the present embodiment, the CPU 10 (processor) writes to the DRAM 20 (first memory device) the prefetch request to instruct prefetching of the target data stored in the NAND flash memory 31 (nonvolatile memory)

included in the CXL device 30 (second memory device) before issuing the load command. In addition, in the present embodiment, the prefetch controller 33 included in the CXL device 30 reads the prefetch request written to the DRAM 20 from the DRAM 20 and performs prefetching the target data based on the read prefetch request.

In the present embodiment, since the CPU 10 can load the target data which has been prefetched based on the prefetch request (i.e., the target data stored in the cache memory 32), by this configuration, the latency in reading the target data from the NAND flash memory 31 can be hidden and the read performance of the CXL device 30 can be improved.

Incidentally, in the present embodiment, a plurality of prefetch request queues 21 may be included in the DRAM 20. In addition, the depth of each prefetch request queue may be set to any depth within the controllable range of the CXL device 30.

A configuration for prefetching the target data using MemSpecRd (speculative_read) on the CXL standard will be considered as a comparative example of the present embodiment.

Such a comparative example of the present embodiment can hide the latency in reading the target data from the NAND flash memory, but the CPU may be restricting the number of MemSpecRd that can be issued.

More specifically, in a case where the CPU is a multi-core processor and a plurality of application programs are executed in parallel as described above, the number of MemSpecRd (i.e., prefetch requests) that can be issued simultaneously (i.e., the outstanding number) is considered to be desirably several hundreds to several thousands, in order for the CPU to execute other processes while the CXL device processes (executes) MemSpecRd. According to the hardware of the CPU, however, it is highly likely that such a number of MemSpecRd to be issued in a range from several hundreds to several thousands cannot be implemented.

In other words, in the comparative example of the present embodiment described above, the number of MemSpecRd (prefetch requests) that can be issued is limited, and efficient processing of the CPU cannot be implemented.

In contrast, the prefetch request queue 21 in the present embodiment corresponds to a software queue stored in DRAM 20, and it is possible to structure a plurality of prefetch request queues 21 and to make each prefetch request queue 21 deeper. Therefore, since there is no upper limit to the number of prefetch requests that can be written to prefetch request queues 21 (outstanding number) in the present embodiment, efficient processing of the CPU 10 can be implemented. Incidentally, for example, a system capable of issuing the prefetch requests whose outstanding number is 1,000 or more is assumed in the present embodiment.

In addition, in the present embodiment, the CPU 10 notifies the prefetch controller 33 that the prefetch request has been written to the DRAM 20 and, when the notification from the CPU 10 (i.e., that the write pointer position written to the doorbell register 331 has been updated) is detected, the prefetch controller 33 performs prefetching the target data based on the prefetch request. In the present embodiment, it is possible to properly detect the prefetch request issued by the CPU 10 and prefetch the target data, by this configuration.

Incidentally, in the present embodiment, the address assigned to the target data is included in the prefetch request, and the target data is data of the cache line size (e.g., 64 bytes), which is read from the NAND flash memory 31 based on the address. In other words, it is assumed in the present embodiment that the prefetch requests are written to the prefetch request queue 21 in cache line units.

In such a configuration, however, if the target data is data equivalent to a plurality of cache line sizes, a plurality of prefetch requests need to be written to the prefetch request queue 21 (prefetching needs to be performed a plurality of times), and the number of such prefetch requests increases (a large number of outstanding requests are consumed).

For this reason, the present embodiment may be configured such that a prefetch request including the data size (i.e., size information indicating the size of the data to be prefetched) is written to the prefetch request queue 21 in addition to the address, and that prefetching the target data is performed based on the data size. In such a configuration, even if the target data is the data corresponding to a plurality of cache line sizes, prefetching the target data can be performed based on a single prefetch request, and efficient prefetching can be thereby implemented.

In addition, it has been described in the present embodiment that the prefetched target data is loaded (accessed) based on the load command issued by the CPU 10, but the target data does not need to be necessarily loaded. In other words, in the present embodiment, the target data may be prefetched based on the prefetch request written to the DRAM 20, and it may be assumed that the prefetched target data is not loaded based on the load command but discarded in the cache memory 32.

In addition, it has been described in the present embodiment that the target data is prefetched by reading the target data from the NAND flash memory 31 and writing the read data to the cache memory 32, but the NAND flash memory 31 is an example of the nonvolatile memory, and an example of the cache memory 32 is SRAM. Incidentally, in the present embodiment, the nonvolatile memory and the cache memory 32 may be different in memory elements, and the cache memory 32 may be configured with the memory device which can be accessed at a higher speed than the nonvolatile memory. More specifically, it is assumed in the present embodiment that, for example, a nonvolatile memory with a data read latency of 1 μs or more and the cache memory 32 with a data read latency of less than 1 μs are used.

Incidentally, it is assumed in the present embodiment that the cache memory 32 is mainly configured with SRAM, but the cache memory 32 may be configured with, for example, DRAM. In addition, the cache memory 32 may be realized by, for example, the other memory device.

It has been described that one example of the nonvolatile memory is the NAND flash memory 31, but the nonvolatile memory may be a memory other than the NAND flash memory 31. Furthermore, when the above-described cache memory 32 is configured with SRAM, the present embodiment may be configured such that the nonvolatile memory is replaced with DRAM.

Furthermore, it has been described in the present embodiment that the target data read from the NAND flash memory 31 is written to the cache memory 32, but the target data may be stored in not the cache memory 32, but, for example, DRAM 20. In addition, the target data may be stored in a memory device other than the DRAM 20 provided outside the CXL device 30 (i.e., a memory device which can be accessed faster than the NAND flash memory 31).

As shown in FIG. 4, the processing time (first processing time) of the CPU 10 required to load the data stored in the NAND flash memory 31 based on a load command issued by the CPU 10 is defined as processing time A. In contrast, as shown in FIG. 2, a processing time (second processing time)

of the CPU 10 required to prefetch the data is defined as processing time B, and a processing time (third processing time) of the CPU 10 required to load the data written to the cache memory 32 by the prefetching is defined as processing time C. In this case, if the relationship that the processing time A is greater than a sum of the processing time B and the processing time C (i.e., the relationship B+C<A) is satisfied, improvement of the read performance of the CXL device 30 can be achieved by the configuration of the present embodiment.

It has been described in the present embodiment that the cache memory 32 is mainly used for prefetching the target data, but the cache memory 32 may be used, for example, to cache data other than the data read from the NAND flash memory 31 based on a prefetch request (i.e., the data loaded from the NAND flash memory 31 based on the load command or the data stored in the NAND flash memory 31 based on the store command).

Second Embodiment

Next, a second embodiment will be described. It has been described in the first embodiment that the CPU updates a doorbell register when a prefetch request is written to a prefetch request queue, but the CXL device performs polling of the prefetch request queue (i.e., an operation of regularly reading and monitoring the data) in the present embodiment.

FIG. 5 is a block diagram showing a configuration example of an information processing system according to the present embodiment. In FIG. 5, the same portions as those in FIG. 1 are denoted by the same reference numerals, and their detailed description are omitted. Portions different from FIG. 1 will be mainly described.

As shown in FIG. 5, a prefetch controller 33 in the present embodiment includes a queue monitoring unit 332.

The queue monitoring unit 332 operates to poll (a prefetch request queue 21 included in) a DRAM 20.

An example of a procedure of the information processing system 1 according to the present embodiment will be described below with reference to a sequence chart in FIG. 6.

In the present embodiment, the queue monitoring unit 332 included in the prefetch controller 33 performs polling for the prefetch request queue 21 (step S11).

Figure 2:
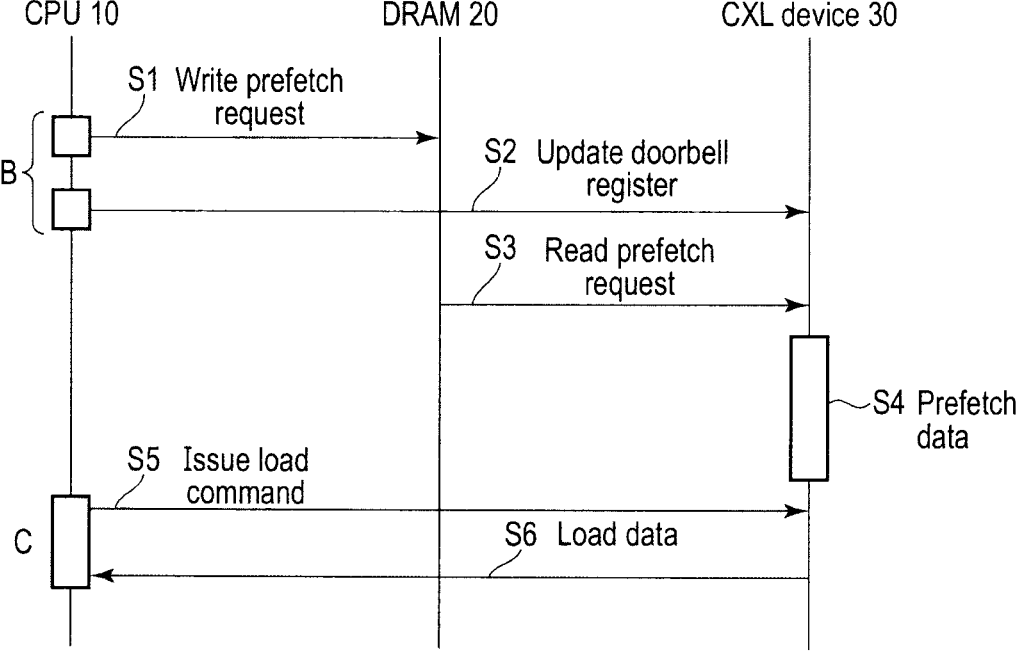
FIG. 2 is a sequence chart showing a configuration example of the information processing system according to the first embodiment.

Performing the polling after performing a process of step S12, which corresponds to the above-described process of step S1 shown in FIG. 2 is assumed (step S13).

In this case, the queue monitoring unit 332 detects that the prefetch request has been written to the prefetch request queue 21 by performing the polling, and performs prefetching the target data based on the prefetch request (step S14). Incidentally, the process of step S14 is the same as the above-described process of step S4 shown in FIG. 2.

After the process of step S14 is executed, the above-described processes of steps S5 and S6 shown in FIG. 2 are performed.

Figure 7:
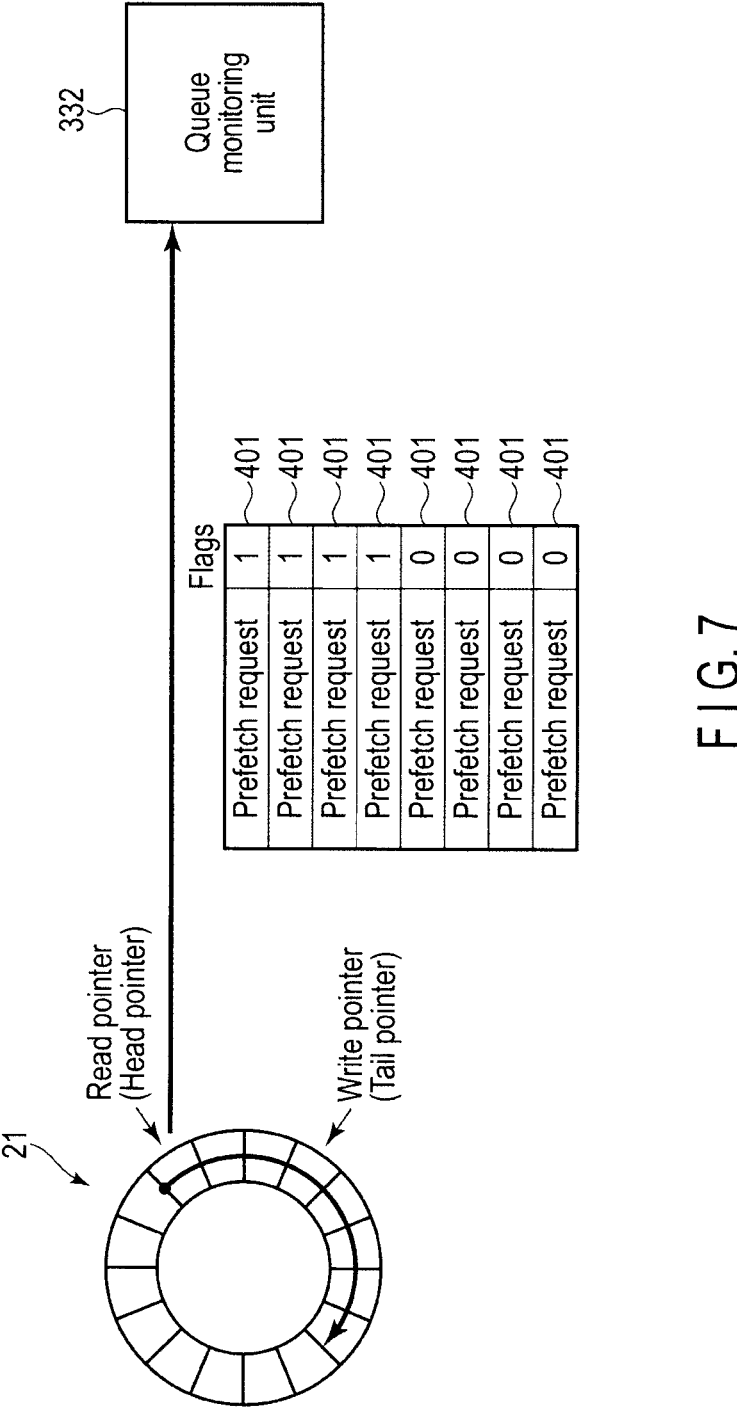
FIG. 7 is a view illustrating an overview of polling performed in the second embodiment.

An overview of the polling performed in the present embodiment will be described with reference to FIG. 7.

It has been described in the first embodiment that the prefetch request includes the address allocated to the target data (i.e., the data to be loaded based on the load command), but the prefetch request in the present embodiment is assumed to include, in addition to the address, a flag indicating whether or not the prefetch request is a newly issued prefetch request that has not yet been processed by the CXL device 30 (hereinafter referred to as a new prefetch request).

In polling, the queue monitoring unit 332 accesses the DRAM 20 and reads the prefetch request from the prefetch request queue 21. More specifically, the queue monitoring unit 332 reads a predetermined number of prefetch requests (entries) from the prefetch request queue 21, based on the above-described read pointer. An example of reading eight prefetch requests is illustrated in FIG. 7.

Next, the queue monitor 332 refers to flags included in the respective prefetch requests read from the prefetch request queue 21 to identify new prefetch requests. In the example shown in FIG. 7, four prefetch requests whose flag 401 is "1" are new prefetch requests, and the target data (the data to which the addresses included in the prefetch requests are assigned) are prefetched based on those prefetch requests. In contrast, four prefetch requests whose flag 401 is "0" are discarded.

According to such polling, it is possible to detect that new prefetch requests are written to the prefetch request queue 21.

Since a plurality of prefetch requests are read at a time in the above-described polling, the number of communications between the DRAM 20 and the CXL device 30 can be reduced, and the number of transactions on the bus connecting the DRAM 20 and the CXL device 30 can be reduced.

Incidentally, when the above-described polling is performed, the read pointer in the prefetch controller 33 is updated based on the number of prefetch requests for which flag 401 is valid, among the prefetch requests read from the prefetch request queue 21.

By the way, in the present embodiment, it is detected that a new prefetch request is written to the prefetch request queue 21 based on the flags included in the prefetch requests and, if "1 (High)" is defined as a valid flag, a clearing process of resetting the flag to "0 (Low)" needs to be performed when the read process or prefetch process of the prefetch request is completed.

However, the clearing process can be a factor that inhibits the process of reading the prefetch requests from the prefetch request queue 21.

Then, an example of a flag management method that makes the above-described clearing process unnecessary will be described here.

When the prefetch request queue 21 is realized as a ring queue (ring buffer) similarly to the first embodiment described above, a phase bit method of inverting and writing the flag at each lap of the prefetch request queue 21 can be applied as the flag management method in the present embodiment.

In the phase bit method, the CPU 10 initializes (the field of) the flag included in the prefetch request in the prefetch request queue 21 with, for example, "0 (Low)".

When writing the prefetch request to the prefetch request queue 21 based on the write pointer at odd-number laps, the CPU 10 sets the flag included in the prefetch request to "1 (High)".

In this case, the queue monitoring unit 332 can recognize that the prefetch request is a new prefetch request if the flag included in the prefetch request in the prefetch request queue 21 is "1" at odd-number laps, and can recognize that the prefetch request is not a new prefetch request if the flag is "0".

In contrast, when writing the prefetch request to the prefetch request queue 21 based on the write pointer at even-number laps, the CPU 10 sets the flag included in the prefetch request to "0".

In this case, the queue monitoring unit 332 can recognize that the prefetch request is a new prefetch request if the flag included in the prefetch request in the prefetch request queue 21 is "0" at even-number laps, and can recognize that the prefetch request is not a new prefetch request if the flag is "1".

In other words, in the above-described phase bit method, the flag indicating whether or not the prefetch request is a new prefetch request is inverted according to the laps of the prefetch request queue 21. In this case, the queue monitoring unit 332 operates to invert the criteria for recognizing whether or not the prefetch request is a new prefetch request in accordance with the laps of the prefetch request queue 21.

According to such a phase bit method, when prefetching of the target data is performed based on a new prefetch request, the clearing process of changing the flag included in the prefetch request does not need to be performed, and the process of reading the prefetch request from the prefetch request queue 21 cannot be interfered with by the clearing process.

In the present embodiment, as described above, when it is detected that the prefetch request has been written to the DRAM 20 (prefetch request queue 21) by periodically monitoring (i.e., polling) the DRAM 20, prefetching the target data is performed based on the prefetch request.

In the present embodiment, as compared to the above-described first embodiment, the load on the CPU 10 can be reduced since the CPU 10 does not need to update the doorbell register 331 (i.e., to write the write pointer position to the doorbell register 331).

Third Embodiment

Next, a third embodiment will be described. It has been mainly described in the first embodiment that the memory address (physical address) assigned to the CXL device 30 is included in the prefetch request by, for example, the system. In the present embodiment, a virtual address is included in the prefetch request, and the virtual address is converted into a memory address (physical address) on the CXL device side.

Incidentally, the virtual address refers to an address assigned to each application. In other words, in such a virtual address, for example, virtual address 0x0 of an application 1 may indicate physical address 0x1000, and virtual address 0x0 of an application 2 may indicate physical address 0x2000.

FIG. 8 is a block diagram showing a configuration example of an information processing system according to the present embodiment. In FIG. 8, the same portions as those in FIG. 1 are denoted by the same reference numerals, and their detailed description are omitted. Portions different from FIG. 1 will be mainly described.

As shown in FIG. 8, a prefetch controller 33 in the present embodiment includes an address conversion unit 333.

In the present embodiment, a virtual address for accessing the target data (i.e., data to be loaded based on a load command) is included in a prefetch request that a CPU 10 writes to a prefetch request queue 21.

The address conversion unit 333 includes an address conversion table. The address conversion unit 333 converts the virtual address included in the prefetch request into a memory address (physical address) by referring to the address conversion table.

In the present embodiment, prefetching the target data is performed using the physical address converted from the virtual address by the address conversion unit 333.

An example of a procedure of the information processing system 1 according to the present embodiment will be described below with reference to a sequence chart in FIG. 9.

First, processes of steps S21 to S23, which correspond to the above-described processes of steps S1 to S3 shown in FIG. 2, are performed. Incidentally, it is assumed that a virtual address is included in the prefetch request written to the prefetch request queue 21 in step S21 (i.e., the prefetch request read from the prefetch request queue 21 in step S23) as described above.

In this case, the address conversion unit 333 included in the prefetch controller 33 converts the virtual address included in the prefetch request into a memory address (physical address) by referring to the address conversion table (step S25).

FIG. 10 shows an example of a data structure of the address conversion table. As shown in FIG. 10, virtual addresses and physical addresses are stored in association with each other in the address conversion table.

In the example shown in FIG. 10, virtual address 0 and physical address 0 are stored in association with each other in the address conversion table. According to this, for example, when virtual address 0 is included in the prefetch request, the address conversion unit 333 can convert the virtual address 0 into physical address 0.

Similarly, virtual address 1 and physical address 1 are stored in association with each other in the address conversion table. According to this, for example, when virtual address 1 is included in the prefetch request, the address conversion unit 333 can convert the virtual address 1 into physical address 1.

Furthermore, virtual address 2 and physical address 2 are stored in association with each other, in the address conversion table. According to this, for example, when virtual address 2 is included in the prefetch request, the address conversion unit 333 can convert the virtual address 2 into physical address 2.

It has been described that virtual addresses 0 to 2 are converted into physical addresses 0 to 2, respectively. Even if other virtual addresses are included in the prefetch request, the virtual addresses can be converted into physical addresses by referring to the address conversion table in the same manner.

Incidentally, for example, the address conversion table shown in FIG. 10 is assumed to be set in advance in the address conversion unit 333 by the CPU 10.

Descriptions return to FIG. 9. Processes of steps S25 to S27, which correspond to the processes of steps S4 to S6 shown in FIG. 2, are performed. In step S25, the prefetch controller 33 performs a process of reading the target data from the NAND flash memory 31, based on the physical address converted from the virtual address in step S24, and writing the read target data to the cache memory 32.

In the present embodiment, as described above, the prefetch request includes a virtual address to access the target data, and prefetching the target data is performed using the physical address converted from the virtual address by referring to the address conversion table.

In the present embodiment, since the CPU 10 can instruct prefetching using the virtual address, by the configuration, the ease of developing application programs to be executed in (the information processing apparatus including) the CPU 10 is improved.

In addition, applications usually manage storage regions using only virtual addresses, and the system performs the conversion from virtual addresses to physical addresses. For this reason, in order to specify a physical address in a prefetch request, the application needs to perform the same process as the conversion performed by the system, which is a factor of increase in load on application processing. In the present embodiment, since the CXL device 30 performs the conversion from virtual addresses to physical addresses, the application can manage the storage region using only virtual addresses, and the increase in load on the address conversion can be avoided.

The address conversion table where the virtual addresses and the physical addresses are stored in association with each other as shown in FIG. 10 has been described in the present embodiment, but the address conversion table may be configured to store a virtual address range and a physical address range correspondingly as shown in FIG. 11. A virtual address range is a range corresponding to a plurality of virtual addresses. Similarly, a physical address range is a range corresponding to a plurality of physical addresses. Incidentally, the virtual address range and the physical address range may be represented by a starting address and a size, respectively.

According to such an address conversion table, for example, when the virtual address range is included in the prefetch request, it is possible to convert the virtual address range into the physical address range and prefetch the target data using the plurality of physical addresses corresponding to the physical address range. In this configuration, since the prefetch request does not need to be issued (written to the prefetch request queue 21) for each virtual address, efficient prefetching can be implemented.

In addition, it has been described in the present embodiment that the virtual address is included in the prefetch request, but the virtual address may be other information that can be converted into the physical address in the NAND flash memory 31. More specifically, for example, when the memory region is divided and managed on the information processing apparatus (CPU 10) side, a combination of a memory region ID to identify the memory region in which the target data is stored and an offset corresponding to the position of the target data in the memory region (offset in region) may be used instead of the virtual address. In this case, a pair of the memory region ID and the offset, and the physical address to be converted from the pair of the memory region ID and the offset, may be stored in association with each other, in the address conversion table. In other words, the virtual address in the present embodiment may be changed according to the data management method in the information processing apparatus.

The configuration in which the address conversion unit 333 is added to the prefetch controller 33 described in the first embodiment has been described in the present embodiment, but the present embodiment may be applied to the above-described second embodiment. More specifically, the present embodiment may be configured such that the address conversion unit 333 is added to the prefetch controller 33 shown in FIG. 5.

Fourth Embodiment

Next, a fourth embodiment will be described. It has been described in the first embodiment that a load command is issued after a prefetch request is simply written to the prefetch request queue but, in the present embodiment, a load command is issued, based on a response indicating completion of prefetch based on the prefetch request (hereinafter referred to as a completion notification).

FIG. 12 is a block diagram showing a configuration example of an information processing system according to the present embodiment. In FIG. 12, the same portions as those in FIG. 1 are denoted by the same reference numerals, and their detailed description are omitted. Portions different from FIG. 1 will be mainly described.

As shown in FIG. 12, a DRAM 20 in the present embodiment includes a completion queue 22 (completion region). The above-mentioned completion notification is written to the completion queue 22 when prefetching target data is completed based on a prefetch request written to a prefetch request queue 21.

In the present embodiment, a CPU 10 issues a load command when detecting that the completion notification has been written to the completion queue 22.

An example of a procedure of the information processing system 1 according to the present embodiment will be described below with reference to a sequence chart in FIG. 13.

First, processes of steps S31 to S34, which correspond to the above-described processes of steps S1 to S4 shown in FIG. 2, are performed.

The completion notification is written to the completion queue 22 when prefetching the target data is completed based on the prefetch request, in the present embodiment. After the above-described process of step S32 is executed, the CPU 10 executes polling to detect that the completion notification has been written to the completion queue 22 (step S35).

When prefetching the target data in step S34 is completed, the prefetch controller 33 writes the completion notification to the completion queue 22 (step S36).

Next, it is assumed that polling is performed by the CPU 10 after the process of step S36 is executed (step S37). In this case, it is detected by the CPU 10 that the completion notification has been written to the completion queue 22, and processes of steps S38 and S39, which correspond to the above-described processes of steps S5 and S6 shown in FIG. 2, are performed.

An overview of operations of the information processing system 1 according to the present embodiment will be described with reference to FIG. 14.

As shown in FIG. 14, the completion queue 22 in the present embodiment is assumed to be realized as a ring queue (ring buffer), similarly to the prefetch request queue 21.

In addition, it is also assumed that a prefetch request is read from the prefetch request queue 21 based on the read pointer by a prefetch controller 33 and that prefetching the target data is completed based on the prefetch request.

In this case, the prefetch controller 33 writes a completion notification to the completion queue 22. Incidentally, the completion notification is written to, for example, a region of the completion queue 22 corresponding to the prefetch request (i.e., a region of the prefetch request queue 21 from which the prefetch request is read).

By executing such polling of the completion queue 22, the CPU 10 can detect that the completion notification corresponding to the prefetch request in which prefetching the target data has been completed as described above has been written to the completion queue 22 and can issue a load command requesting the target load.

It has been described that the completion notifications is written to the completion queue 22, but the completion notification may be written to a completion map 23 as shown in FIG. 15. Incidentally, the completion notification of the completion map 23 is realized by a method in which the CPU 10 specifies the storage location (index) of the completion notification corresponding to the prefetch request in a field in the prefetch request. The CPU 10 detects that the completion notification has been written, by monitoring the index location specified by the prefetch request, and thereby discriminates that the prefetch request has been processed. When it is determined that the process of the prefetch request is completed (i.e., prefetch completion is detected), the CPU 10 can issue the load command requesting the target data. According to this method, the control load on the completion queue 22 can be reduced, and the load on the CPU 10 is reduced.

As described above, in the present embodiment, the load command is issued when it is detected that the completion notification (i.e., the response to the prefetch request) has been written to the DRAM 20. The CPU 10 can avoid issuing the load command (i.e., the load command is issued after confirm that prefetching the prefetch target data has been completed and issue the load command) even though prefetching the target data has not been completed.

By the way, it has been described in the present embodiment that the processing shown in FIG. 13 is performed. In the processing shown in FIG. 13, latency from the completion of prefetching the target data until the CPU 10 issues the load command further occurs in addition to the latency in reading the target data from the NAND flash memory 31 in the prefetching of the target data.

An example of a procedure of the information processing system 1 (hereinafter referred to as a first modified example of the present embodiment) for reducing the latency that occurs from the completion of prefetching the target data as described above until the CPU 10 issues the load command will be described below with reference to a sequence chart of FIG. 16.

First, processes of steps S41 to S43, which correspond to the above-described processes of steps S31 to S33 shown in FIG. 13, are performed.

In addition, after the process of step S42 is executed, the CPU 10 executes polling to detect that the completion notification has been written to the completion queue 22 (step S44).

In the present modified example, the prefetch controller 33 writes the completion notification to the completion queue 22 (step S45). Note that the completion notification is written to the completion queue 22 before prefetching the target data based on the prefetch request read from the prefetch request queue 21 in step S43.

The completion notification written to the completion queue 22 in the modified example includes latency information indicating the latency which occurs when the target data is prefetched (i.e., the target data is read from the NAND flash memory 31 and the read target data is written to the cache memory 32). For example, this latency information may be managed (set) in advance by the CXL device 30 (prefetch controller 33).

After the process of step S45 is executed, a process of step S46, which corresponds to the above-described process of step S34 shown in FIG. 13, is executed.

Next, it is assumed that polling is performed by the CPU 10 after the process of step S45 is executed (step S47). In this case, the CPU 10 detects that the completion notification has been written to the completion queue 22 and waits until a time (hereinafter referred to as a waiting time) corresponding to the latency indicated by the latency information included in the completion notification written to the completion queue 22 elapses (step S48). Incidentally, it has been described that the CPU 10 waits in step S48, but the CPU 10 may perform the other process in step S48 until the waiting time elapses.

After the process of step S48 is executed, processes of steps S49 and S50, which correspond to the above-described processes of steps S38 and S39 shown in FIG. 13, is executed. Incidentally, the processes of steps S49 and S50 may be performed at any timing after the waiting time has elapsed.

In the above-described modified example, the latency that occurs from the completion of prefetching of the target data until the CPU 10 issues the load command can be reduced, by the configuration that the CPU 10 issues the load command based on the latency information included in the completion notification written to the completion queue 22 from the CXL device 30 (i.e., the latency notified by the CXL device 30).

It is assumed that the target data is stored in the NAND flash memory 31 (i.e., not stored in the cache memory 32), but the target data may be already stored in the cache memory 32. In this case, the CPU 10 can issue the load command without waiting until the above-described waiting time elapses.

Figures 17, 18:
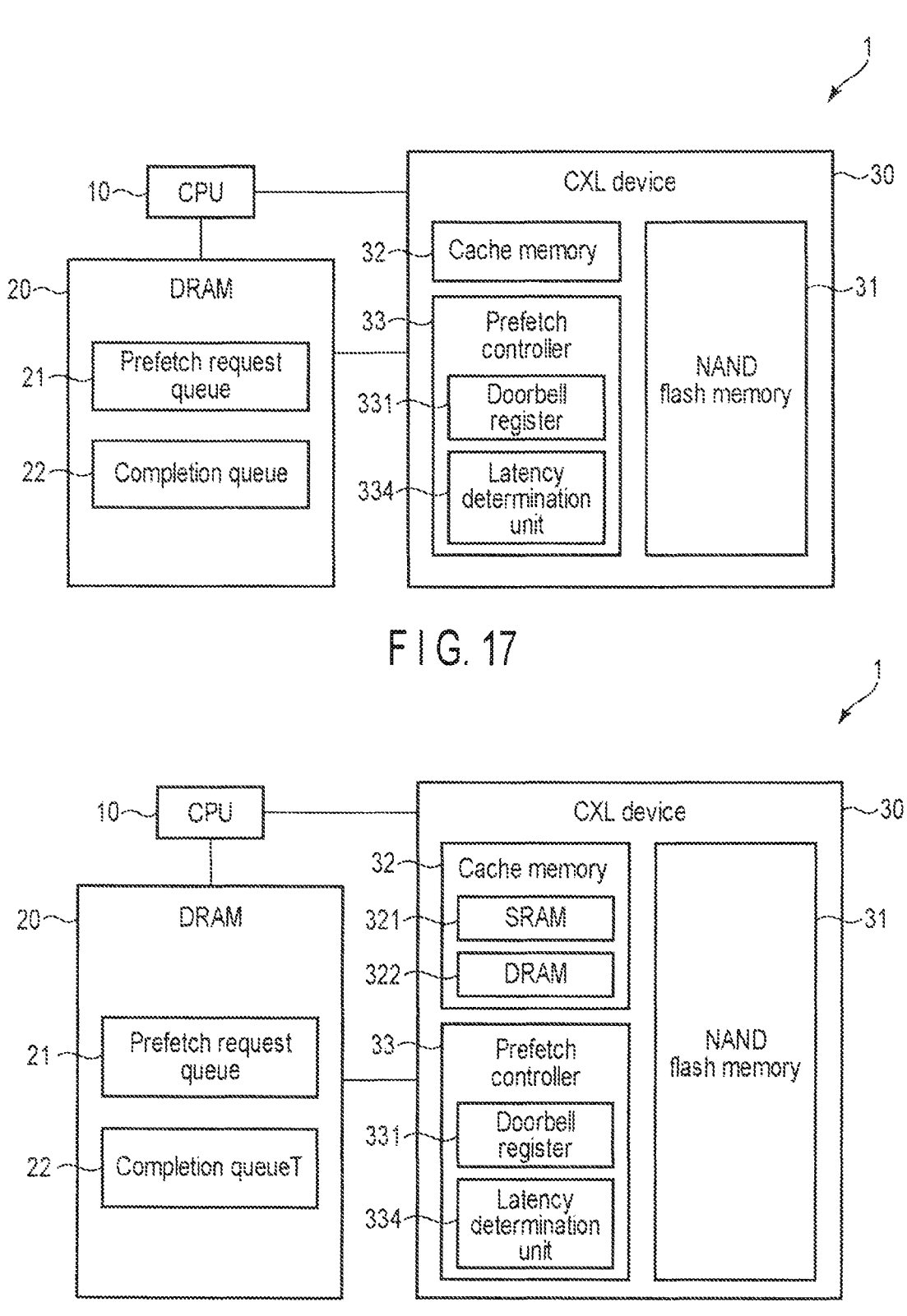
FIG. 17 is a block diagram showing another configuration of the information processing system according to the first modified example of the fourth embodiment.
FIG. 18 is a block diagram showing yet another configuration of the information processing system according to the first modified example of the fourth embodiment.

For this reason, in the modified example, the prefetch controller 33 may be configured to include a latency determination unit 334, as shown in FIG. 17.

The latency determination unit 334 includes media information indicating the media (NAND flash memory 31 or cache memory 32) in which data in the CXL device 30 is stored, and determines the latency to be notified to the CPU 10 based on the media information.

More specifically, for example, when it is indicated by the media information that the target data is stored in the NAND flash memory 31, the latency determination unit 334 reads the target data from the NAND flash memory 31, and determines the latency (hereinafter referred to as latency for NAND flash memory 31) in writing the read target data to the cache memory 32 as the latency to be notified to the CPU 10.

In contrast, for example, when it is indicated by the media information that the target data is stored in the cache memory 32, the target data does not need to be prefetched, and the latency determination unit 334 can thereby determine at least a latency shorter than the above-described latency for the NAND flash memory 31 (hereinafter referred to as latency for the cache memory 32) as the latency to be notified to the CPU 10. Incidentally, the latency for the cache memory 32 may be 0.

In this case, the completion notification including the latency information indicating the latency determined by the latency determination unit 334 as described above is written to the completion queue 22.

Incidentally, it is assumed that the correspondence between the media in which the target data is stored and the latency (i.e., the information used to determine the latency based on the media information) is managed (set) in advance in the latency determination unit 334.

It has been described that the target data is stored in the NAND flash memory 31 or the cache memory 32 (e.g., SRAM), but the cache memory 32 may include a multi-level cache including DRAM 322 in addition to SRAM 321 as shown in FIG. 18. In such a configuration, when the target data for a prefetch request exists in the DRAM 322, the target data is read from the DRAM 322 and written to the SRAM 321. In other words, the latency determination unit 334 reads the target data from the DRAM 322 and determines the latency which occurs in writing the target data to the SRAM 321 as the latency to be notified to the CPU 10.

Thus, in the hierarchical memory configuration, the write latency of the memory of prefetch destination from the read latency of the memory in which the target data exists is determined as the latency (information) to be notified to the CPU 10. In the hierarchical memory configuration, use of the DRAM 322, a magnetic memory or the like as a memory element having performance intermediate between the SRAM 321 and the NAND flash memory 31 is considered. For example, use of a memory element accessed at a slower speed than the NAND flash memory 31 or a storage device such as SSD as a lower-level memory region is also considered. In either configuration, if the above-described relationship of B+C<A is satisfied, the improvement in read performance of the CXL device 30 can be achieved.

In the modified example, as described above, a situation in which the CPU 10 waits longer than necessary (i.e., inefficient operation of the CPU 10) can be avoided by the configuration of writing to the completion queue 22 the completion notification including the latency information indicating different latencies depending on (media information indicating) the media in which the target data is stored.

Incidentally, for example, the latency that occurs in prefetching the target data is considered to be affected by a write process (store command) and a read process (load command) of the other data to/from the NAND flash memory 31. For this reason, the latency information included in the above-described completion notification may be changed in accordance with the number of already issued commands (store commands and load commands) or the like.

By the way, in the above-described first modified example of the present embodiment, the prefetch controller 33 needs to write the completion notification to the completion queue 22 (i.e., the CXL device 30 needs to transmit the completion notification to the DRAM 20) and the CPU 10 needs to perform polling (i.e., to read the completion notification a plurality of times), and the utilization of the information processing system 1 may become large.

An example of a procedure of the information processing system 1 (hereinafter referred to as a second modified example of the present embodiment) for reducing the above-described utilization will be described below with reference to a sequence chart of FIG. 19. In the following descriptions, the latency indicated by the latency information described in the first modified example of the present embodiment is referred to as a first latency for convenience.

First, in the modified example, it is assumed that a latency assumed in the CPU 10 (hereinafter referred to as a second latency) is notified to the CXL device 30 from the CPU 10 (step S61). The second latency may be a value specified by the CPU 10, and is determined according to, for example, an application program executed in the information processing apparatus (CPU 10). More specifically, the second latency can be determined according to, for example, the time taken for the other process after prefetching. In addition, when the information processing apparatus switches and performs processing of a plurality of application programs, the second latency can be determined according to, for example, the interval at which the processing is switched.

Next, processes of steps S62 to S64, which correspond to the above-described processes of steps S41 to S43 shown in FIG. 16, are performed.

When the process of step S64 is performed, the prefetch controller 33 performs a process (hereinafter referred to as a completion notification determination process) of determining whether or not to write the completion notification to the completion queue 22, based on the above-described first latency and the second latency notified from the CPU 10 to the CXL device 30 in step S61 (step S65).

Details of the completion notification determination process will be described later. It is assumed to be determined that the completion notification is not written to the completion queue 22. In this case, as shown in FIG. 19, the completion notification is not written to the completion queue 22.

After the process of step S65 is executed, a process of step S66, which corresponds to the above-described process of step S46 shown in FIG. 16, is executed.

In contrast, when the process of step S63 is executed, the CPU 10 waits until a time equivalent to the second latency elapses (step S67). Incidentally, in step S67, the CPU 10 may execute other processing until the time equivalent to the second latency elapses.

When the process of step S67 is executed, the CPU 10 accesses the DRAM 20 and reads the completion notification from the completion queue 22 (step S68).

However, since the completion notification is not written to the completion queue 22 as described above, the CPU 10 cannot read the completion notification. In this case, processes of steps S69 and S70, which correspond to the above-described processes of steps S49 and S50 shown in FIG. 16, are performed.

Next, an example of a procedure of the above-described completion notification determination process will be described with reference to a flowchart in FIG. 20.

First, the prefetch controller 33 obtains the latency information indicating the above-described first latency (step S651). The first latency indicated by the latency information obtained in step S651 is the latency which occurs in prefetching the target data, on the assumption that the target data is stored in the NAND flash memory 31. In addition, the first latency indicated by the latency information obtained in step S651 may be a latency determined based on the media information indicating the media in which the target data is stored as described above.

Next, the prefetch controller 33 determines whether or not the first latency indicated by the latency information obtained in step S651 is less than the second latency notified to the CXL device 30 by the CPU 10 in step S61 shown in FIG. 19 (step S652).

If it is determined that the first latency is less than the second latency (YES in step S652), the prefetch controller 33 determines not to write the completion notification to the completion queue 22 (step S653).

In this case, the completion notification is not written to the completion queue 22, and the above-described processes following step S66 shown in FIG. 19 are performed. In other words, in the modified example, for example, when the above-described first latency is less than the second latency due to the target data being stored in the cache memory 32, writing the completion notification can be omitted and the load command can be issued when the time corresponding to the second latency has elapsed.

In contrast, if it is determined that the first latency is not less than the second latency (NO in step S652), the prefetch controller 33 determines to write the completion notification to the completion queue 22 (step S654).

In this case, the above-described completion notification including the latency information obtained in step S651 is written to the completion queue 22. According to this, the CPU 10 can read the completion notification from the completion queue 22 in step S68 shown in FIG. 19. In this case, although not shown in the drawing, the CPU 10 performs the process of step S69 after waiting until the time equivalent to the first latency (i.e., the latency indicated by the latency information included in the completion notification read from the completion queue 22) has passed based on the time when, for example, the process of step S67 is started. In other words, in the modified example, when the above-described first latency exceeds the second latency (i.e., it is presumed that prefetching the target data is not completed at the timing when the time equivalent to the second latency has elapsed), the CPU 10 can issue the load command at appropriate timing based on the latency information, by writing the completion notification including the latency information to the completion queue 22.

In the modified example, as described above, the prefetch controller 33 determines whether or not to write the completion notification to the completion queue 22, based on the first latency which occurs in prefetching the target data and the second latency specified in the CPU 10. In addition, in the modified example, when the completion notification is not written to the completion queue 22, the load command is issued after the time equivalent to the second latency has elapsed.

In the modified example, with such a configuration, writing the completion notification to the completion queue 22 based on the first and second latencies can be omitted (i.e., transmission of the completion notification can be reduced), the CPU 10 does not need to perform polling (i.e., the number of times of read from the completion queue 22 can be minimized), and the utilization of the information processing system 1 can be therefore reduced.

It has been described in the first and second modified examples of the present embodiment that the DRAM 20 includes the completion queue 22, but the first and second modified examples may be applied to a configuration that the DRAM 20 includes the completion map 23 instead of the completion queue 22.

In addition, it has been described that the completion queue 22 is added to the DRAM 20 described in the above-described first embodiment, but the present embodiment may also be applied to the above-described second embodiment. More specifically, the present embodiment may have a configuration that the completion queue 22 is added to the DRAM 20 shown in FIG. 5. Furthermore, the present embodiment may be combined with the above-described third embodiment. The first and second modified examples of the present embodiment may be configured in the same manner as this.

According to at least one embodiment described above, an information processing system capable of improving the read performance can be provided.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information processing system comprising:
   a processor;
   a first memory device; and a second memory device including a nonvolatile memory, the nonvolatile memory being accessed by a load/store command, wherein before issuing a load command to load data stored in the nonvolatile memory, the processor is configured to write a request to instruct prefetching the data to the first memory device, the second memory device includes a controller configured to prefetch the data stored in the nonvolatile memory, based on the request written to the first memory device, the controller is configured to write a response to the request to the first memory device, the response includes latency information indicating first latency which occurs when the data is prefetched, and the processor is configured to issue the load command based on the first latency indicated by the latency information included in the response written to the first memory device.

2. The information processing system of claim 1, wherein the response is written to the first memory device before the data is prefetched.

3. The information processing system of claim 1, wherein the controller is configured to determine whether or not to write the response to the first memory device, based on the first latency and a second latency specified by the processor, and when the response is not written to the first memory device, the processor is configured to issue the load command after the time equivalent to the second latency elapses.

4. An information processing system comprising:

a processor;

a first memory device; and a second memory device including a nonvolatile memory, the nonvolatile memory being accessed by a load/store command, wherein before issuing a load command to load data stored in the nonvolatile memory, the processor is configured to write a request to instruct prefetching the data to the first memory device, the second memory device includes a controller configured to prefetch the data stored in the nonvolatile memory, based on the request written to the first memory device, the controller is configured to prefetch the data based on the request when it is detected that the request is written to the first memory device by periodically monitoring the first memory device, the first memory device includes a queue realized as a ring buffer to which the request is written, a first request written to the queue includes a flag indicating whether or not the first request is a newly issued request, and the controller is configured to read a plurality of requests from the queue, and specify the newly issued request by referring to flags included in the plurality of requests.

5. The information processing system of claim 4, wherein a phase bit method for inverting a flag for each lap of the queue is applied as a management method of the flag.

* * * * *